United States Patent [19]
Takagi

[11] Patent Number: 4,878,005
[45] Date of Patent: Oct. 31, 1989

[54] SERVO SYSTEM

[75] Inventor: Shigeyuki Takagi, Gifu, Japan

[73] Assignee: Teijin Seiki Co., Ltd., Japan

[21] Appl. No.: 161,052

[22] Filed: Feb. 26, 1988

[30] Foreign Application Priority Data

Feb. 27, 1987 [JP] Japan .................................. 62-44846

[51] Int. Cl.⁴ .............................................. G05B 6/02
[52] U.S. Cl. ...................................... 318/621; 318/632
[58] Field of Search ................................ 318/621, 632

[56] References Cited
U.S. PATENT DOCUMENTS 4,071,209  1/1978  Hart ................................. 318/621 X

OTHER PUBLICATIONS

Handbook of Operational Amplifier Circuit Design, pp. 26-4 and 26-5, McGraw-Hill Book Company, 1976.

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A servo system having an improved loop stability and response time. A phase shifting circuit is inserted in the feedback loop providing an open loop phase lag characteristic at a resonance frequency of a load system in a range of $-270°$ to $-360°$. The transfer function of the phase shifting circuit is preferably of the form:

$$\frac{1 - \tau_4 s}{1 + \tau_3 s}$$

where $\tau_3$ and $\tau_4$ represent time constants of the circuit.

5 Claims, 5 Drawing Sheets

SERVO SYSTEM

BACKGROUND OF THE INVENTION

The present invention relates to a servo system having improved dynamic characteristics. More particularly, the invention relates to a servo system having a large secondary lag characteristic in its load system.

Known methods of improving the dynamic characteristics of a servo system have been disclosed in Japanese Laid-Open Patent Publication No. 170901/1983 and Japanese Laid-Open Patent Publication No. 27301/1986 in which a secondary advancing factor is inserted into the feedback loop.

However, in those servo systems, since a secondary lag characteristic of the load system is compensated by an inverse function compensation factor (secondary advancing factor), it is impossible to maintain good stability if there is a nonuniformity in the resonance frequency of the load system.

Furthermore, since an advancing factor is inserted into the feedback loop, the margin of stability is often insufficient.

SUMMARY OF THE INVENTION

An object of the present invention, therefore, is to provide a servo system which exhibits a good response and stability even if the characteristics of the load system to be controlled or external conditions of use change.

In satisfaction of the above and other objects, in accordance with the invention, a phase shifting circuit is inserted into the feedback loop so that a open loop phase lag characteristic at a resonance frequency of the load system is made to be $-270°$ to $-360°$, and a closed-loop gain characteristic at the resonance frequency is maintained below 0 dB. As a result, the stability of the system is maintained, and as a result of the addition of an equivalent advancing factor to the feedback summing point, the response of the system is improved.

BRIEF DESCRIPTION OF THE DRAWINGS

FIGS. 1 to 7 illustrate a preferred embodiment of a servo system constructed according to the present invention, wherein:

FIG. 1 illustrates the overall servo system structure;

FIG. 2 illustrates a phase shifting circuit;

FIG. 3 is a Bode diagram showing the frequency response of the phase shifting circuit;

FIG. 4 is a Bode diagram showing a open loop frequency response characteristic of the servo system;

FIG. 5 is a Bode diagram showing a closed-loop frequency response characteristic of the servo system;

FIG. 6 is a block diagram of a servo system; and

FIG. 7 is a Bode diagram showing frequency response characteristics of another form of the phase shifting circuit.

DESCRIPTION OF THE PREFERRED EMBODIMENTS

Referring to the accompanying drawings, preferred embodiments of the invention will now be described.

Figure 1:
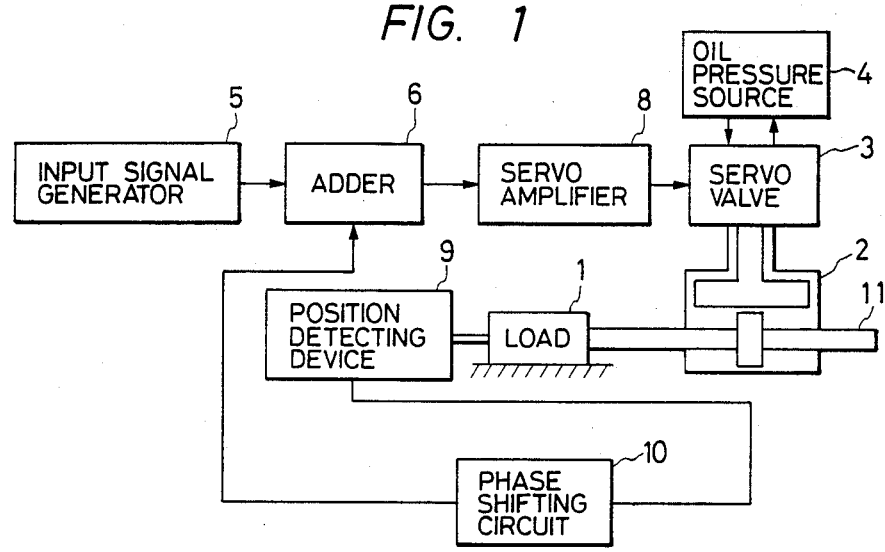

FIG. 1 illustrates a servo system constructed according to a preferred embodiment of the present invention.

Reference numeral 1 represents a load which is actuated by a hydraulic actuator 2. The oil supply to and discharge from the hydraulic actuator 2 is controlled by an electric hydraulic servo valve 3. This servo valve 3 is connected to an oil pressure source 4 which supplies oil to and discharges the same from the servo valve 3.

Reference numeral 5 designates an input signal generator. Signals from the input signal generator 5 are supplied to the servo valve 3 through an adder 6 and a servo amplifier 8. When an instruction signal is supplied to the servo valve 3, the servo valve 3 and the actuator 2 are actuated, whereby the load 1 is displaced. A signal representing the amount of displacement of the load 1 is fed back to the adder 6 through a position detecting device 9 and a phase shifting circuit 10 for the purpose of calculating the deviation from the instruction signal. The load 1 is controlled in such a manner as to force the deviation to zero.

Figure 2:
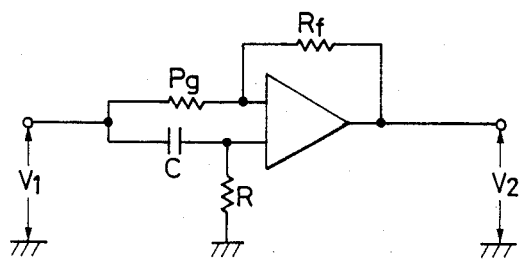
Figure 3:
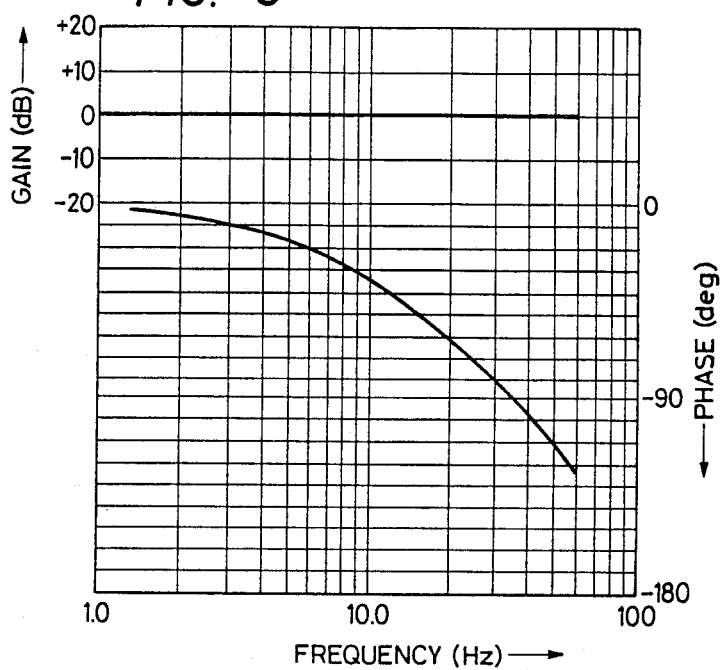

The phase shifting circuit 10 is formed by a circuit shown in FIG. 2, in which resistances $R_g$ and $R_f$ have the same resistance values. The phase shifting circuit 10 includes a resistor $R_g$ connected between an input terminal of the circuit and an input of an operational amplifier, a second resistor $R_f$ connected between an output of the operational amplifier and the inverting input terminal of the amplifier, a capacitor C connected between the input terminal and a non-inverting input terminal of the amplifier, and a third resistor R connected between the non-inverting input terminal and ground. The transfer function $G_1(s)$ of this circuit 10 is $(1-\tau_3 s)/(1+\tau_3 s)$, wherein s represents the Laplace operator, and $\tau_3$ represents a time constant of the circuit. FIG. 3 is a Bode diagram showing the frequency response of the phase shifting circuit 10. As can be clearly seen from this figure, the gain is 0 dB regardless of the frequency, and the phase lag increases gradually as the frequency increases, as a result of which there is a lag of substantially 90° in the vicinity of 36 Hz.

Figure 4:
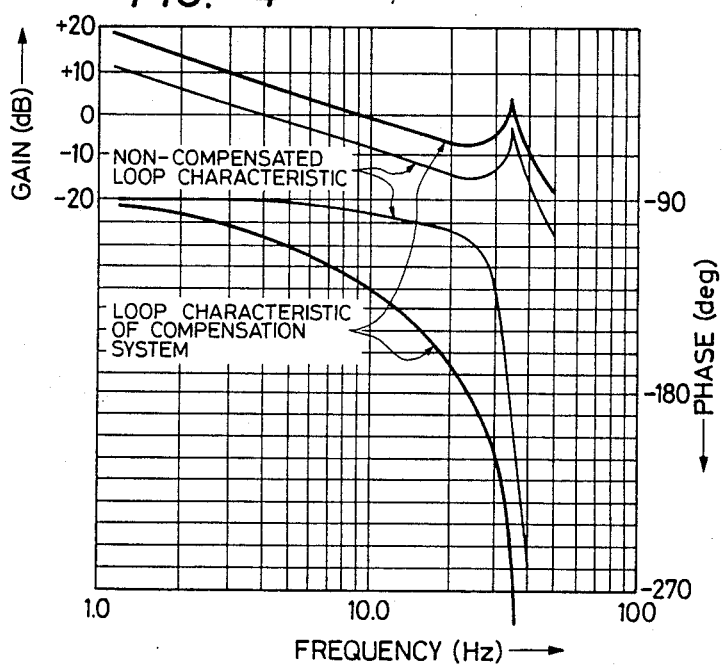

FIG. 4 is a Bode diagram showing the open loop frequency response characteristic when the phase shifting circuit 10 is inserted (in which case the servo system is hereafter termed a compensated system) and when the same is not inserted (termed a noncompensated system). The phase of the noncompensated system is lagged by substantially 195° in the vicinity of 36 Hz, while the phase of the compensated system is lagged by substantially 285° in the vicinity of 36 Hz.

Figure 5:
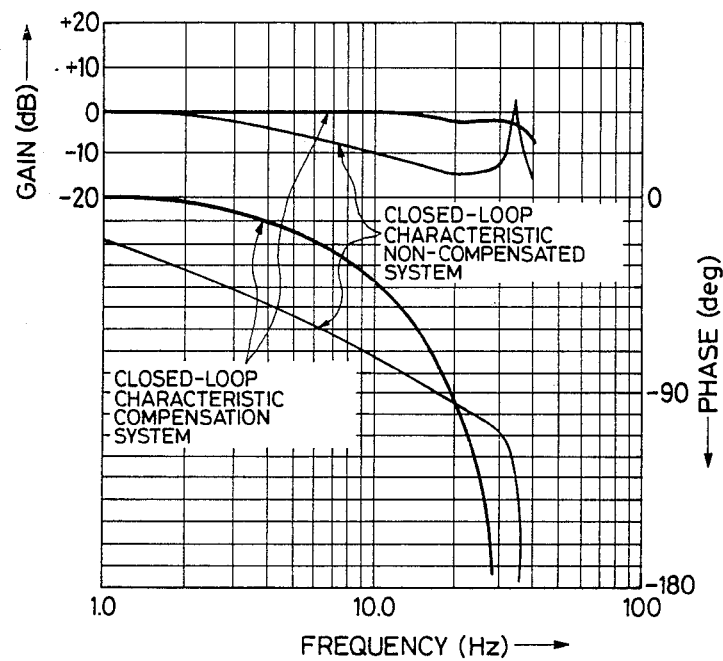

FIG. 5 is a Bode diagram showing the closed-loop frequency response characteristic of the compensated system and the noncompensated system.

As can be clearly seen from FIG. 4, the open loop phase lag characteristic at the resonance frequency of the load system can be set between $-270°$ and $-360°$ due to the contribution of the large phase lag (see FIG. 3) of the phase shifting circuit 10. As a result, as shown in FIG. 5, in the compensated system, the closed-loop gain characteristic of the load portion 1 at the load resonance frequency can be held below 0 dB, whereby good stabilization of the system is achieved.

Moreover, the presence of the phase shifting circuit 10 (see FIG. 3) causes stabilization to be maintained and improves the response of the output portion (load portion 1) because the phase corresponding to the lag of the phase shifting circuit is advanced with respect to the feedback incrementing point 6 without any increase in the open loop gain of the variation characteristics of the load portion 1; that is, an equivalent advancing factor is added to the feedback summing point.

In this embodiment, the gain of the servo amplifier 8 is set at 2.37 times that in the noncompensated system, whereby the response in the lower frequency region is made suitable and the system is made more stable.

Figure 6:
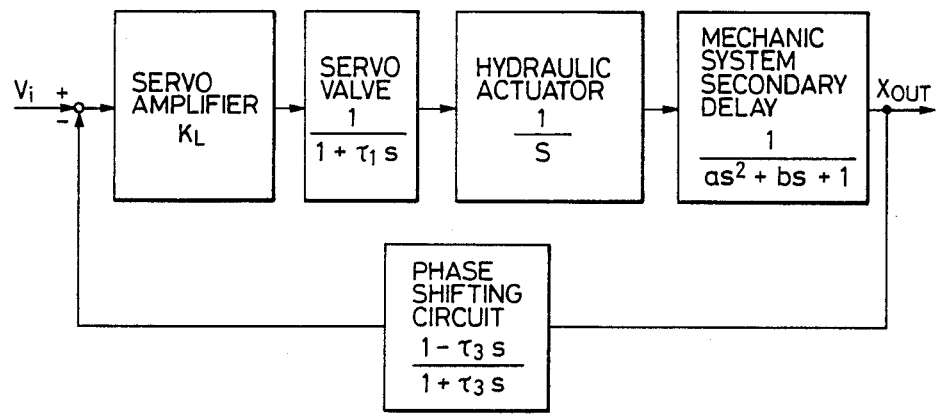

The above-described operation can be understood from the block diagram of the compensation system shown in FIG. 6 and the closed-loop transfer functions $G_3(s)$ and $G_4(s)$ of the feedback summing point and the output portion $X_{out}$ expressed as follows.

$$G_3(s) = \frac{\frac{K_L}{(1 + \tau_1 s)s(as^2 + bs + 1)}}{1 + \frac{K_L(1 - \tau_3 s)}{(1 + \tau_1 s)(as^2 + bs + 1)(1 + \tau_3 s)s}}$$

$$G(s) = G_3(s) \frac{(1 + \tau_3 s)}{(1 - \tau_3 s)}$$

Figure 7:
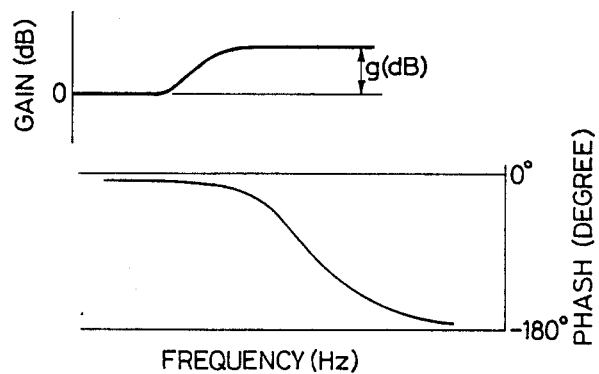
Figure 8:
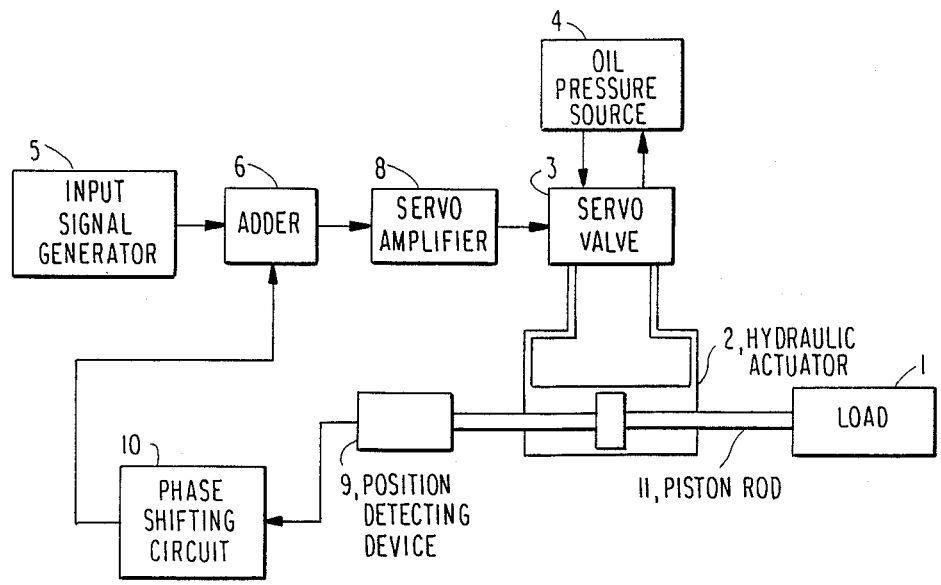
FIG. 8 illustrates the overall servo system structure where a feedback signal is derived from an input side of the load system.

Although the case in which the load 1 is disposed in a closed-loop system has been described, the invention can also be applied to a case where the load is disposed outside the closed loop, that is, a position feedback signal is detected from a piston rod portion 11 disposed at the opposite side of the load 1 shown in FIG. 1. In this case, since the load 1 in the closed-loop has a relatively unstable characteristic compared with the piston rod 11 in the closed-loop system, the stability of the system should be compensated by making the relationship between the resistance $R_g$ and $R_f$ in the phase shifting circuit 10 shown in FIG. 2 $R_f > R_g$. That is, by making the frequency response characteristic of the phase shifting circuit 10 the same as shown in FIG. 7, the loop phase lag characteristic at the load system resonance frequency is made to be $-270°$ to $-360°$, and the loop gain of the load portion is decreased by g dB from the feedback summing point, whereby the increase in gain of the load portion 1 due to the secondary lag is compensated for the purpose of stabilizing the overall system. In this state, the transfer function $G_5(s)$ of the phase shifting time 10 is $(1 - \tau_4 s)/(1 + \tau_3 s)$, where $\tau_3$ and $\tau_4$ represent circuit constants.

As described above, according to the present invention, by inserting a phase shifting circuit into the feedback loop, the open loop phase lag characteristic at the load system resonance frequency is set at $-270°$ to $-360°$, whereby the closed-loop gain characteristic at the resonance frequency becomes below 0 dB. As a result, the system can be stabilized. Furthermore, because an equivalent advancing factor is added to the feedback summing point, the response of the output portion is improved.

Furthermore, since the open loop phase lag characteristic at the load system resonance frequency is between $-270°$ and $-360°$, a wide range of the load system resonance frequency of the system to which the invention is applied is allowed.

What is claimed is:

1. In servo system comprising an adder receiving an input instruction on a first input thereof, a servo amplifier having an output coupled to drive a load system, and a feedback loop for providing an error signal to a second input of said adder, the improvement comprising phase shifting means connected in said feedback loop for imparting a phase lag characteristic at a resonance frequency of said load system in a range of $-270°$ to $-360°$.

2. The servo system of claim 1, wherein said phase shifting means comprises a circuit having a transfer function of:

$$\frac{1 - \tau_4 s}{1 + \tau_3 s}$$

where $\tau_3$ and $\tau_4$ represent circuit time constants of said circuit.

3. The servo system of claim 2, wherein said circuit comprises a first resistor having a resistance $R_g$ connected between an input terminal of said circuit and an inverting input of an operational amplifier, a second resistor having a resistance $R_f$ connected between an output of said operational amplifier and said inverting input terminal, a capacitor connected between said input terminal and a noninverting input terminal of said amplifier, and a third resistor connected between said noninverting input terminal and a ground reference point.

4. The servo system of claim 3, wherein said resistance $R_g$ and $R_f$ are equal.

5. The servo system of claim 3, wherein said feedback signal is derived from an input side of said load system, and wherein $R_f > R_g$.

* * * * *